UNITED STATES PATENT OFFICE.

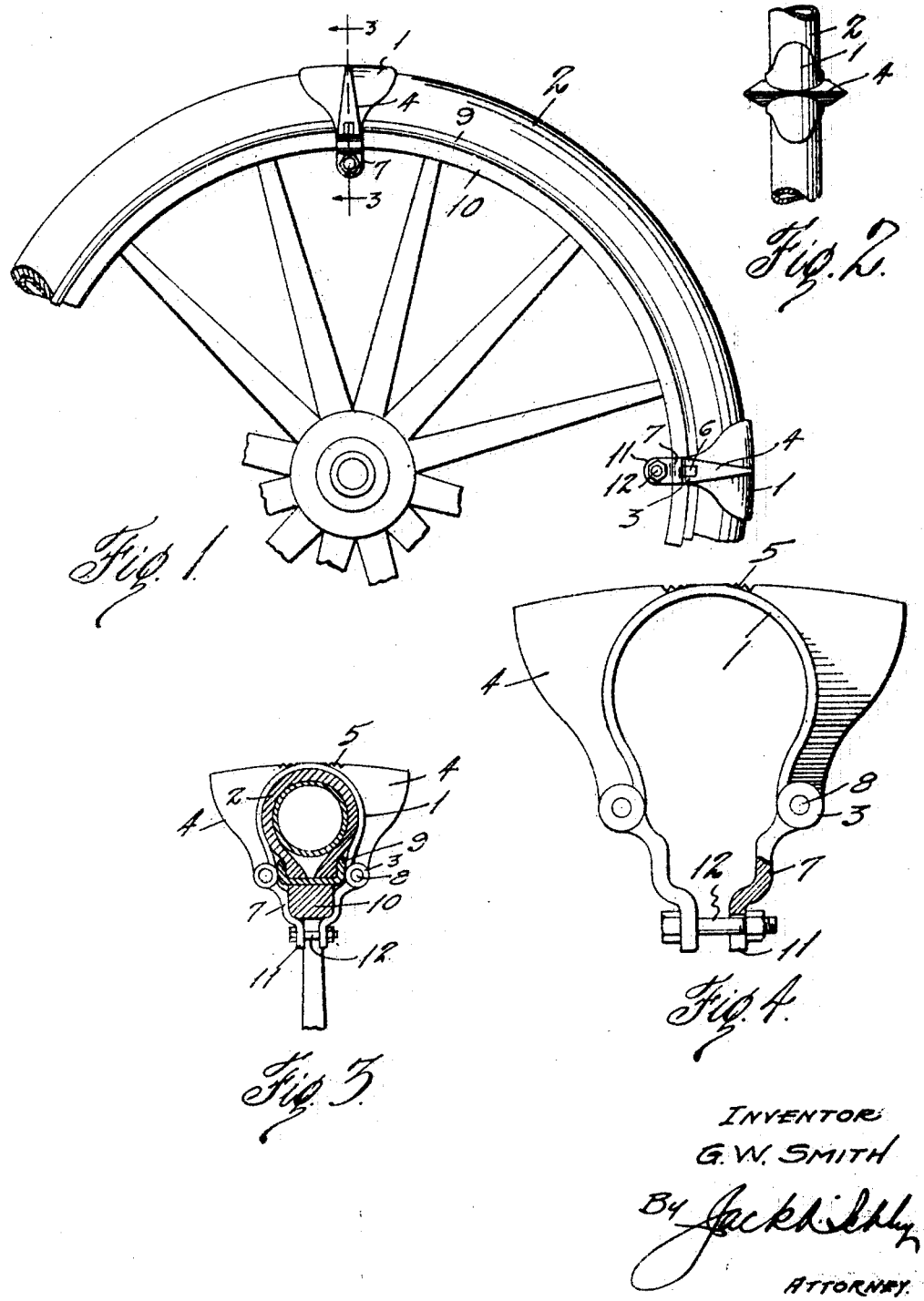

GEORGE W. SMITH, OF DALLAS, TEXAS.

TIRE-TRACTION-LUG.

1,315,688.  Specification of Letters Patent.  Patented Sept. 9, 1919.

Application filed October 28, 1918. Serial No. 259,937.

*To all whom it may concern:*

Be it known that I, GEORGE W. SMITH, a citizen of the United States, residing at Dallas, in the county of Dallas and State of Texas, have invented certain new and useful Improvements in Tire Traction-Lugs, of which the following is a specification.

This invention relates to new and useful improvements in tire traction lugs.

The invention has to do with devices mounted on a motor vehicle wheel tire and including lateral projections for giving traction or preventing slipping of the wheel in mud, sand, snow, slush and other soft road-beds. Such a device will eliminate tire chains and similar devices and give much more satisfactory results. One of the features resides in a structure which will give all of the foregoing advantages and not mar or deface paved streets and roads.

In carrying out the invention a yoke-shaped member is provided and clamped transversly around the tire and felly of the wheel. This member or lug has on each side a laterally directed wedge-shaped ear or projection with its reduced end or edge at the tread of the wheel; whereby it lends traction to the wheel but easily withdraws from a soft road-bed in which it is embedded. The tread edges of the ears may be notched to prevent lateral displacement of the wheel.

The invention will be more readily understood from a reading of the following specification and by reference to the accompanying drawings, in which an example of the invention is shown and wherein:

Figure 1 is a partial side elevation of a wheel showing lugs constructed in accordance with this invention, attached to the tire thereof, Fig. 2 is a fragmentary edge view of the wheel, showing my device applied thereto, Fig. 3 is a cross-sectional view on the line 3—3 of Fig. 1 and Fig. 4 is an enlarged detail of the lug detached.

In the drawings the numeral 1 designates a yoke-shaped tread member which is adapted to fit transversely around the tire 2. The member 1 has its ends on the tread of the tire curved and its sides reduced and terminating, each in a boss 3. Each boss 3 also forms the base of a wedge-shaped ear 4 extending radially toward the tread of the member as well as laterally therefrom. The ears are oppositely disposed and have their outer edges extending from the center of the tread member so as to form substantially a continuous arcuate, transverse tread edge which enters the mud, sand, etc., as the wheel revolves. The ears 3 extending laterally from the tire will act similar to the paddles on a propeller wheel and thus the tire cannot slip and the wheel of the motor vehicle is given traction through the soft road-bed in which it is embedded. The tread edges of the ears may be provided with notches 5 to prevent lateral displacement commonly called "skidding."

The bosses 3 are recessed to receive the ears 6 of clamps 7. The ears 6 are pivoted in the bosses on pins 8, whereby hinge-joints are formed. The bosses are located on each side of the rim 9 of the wheel and the clamps are curved and off-set inward to be arranged inwardly of the rim and against the sides of the felly 10. Each clamp terminates in a lug 11 overhanging the inner circumference of the felly. A bolt 12 fastens the lugs together transversely of the felly. The bolt is supported in one of the lugs and the other is bifurcated so that it may be swung from the bolt when its clamp is moved laterally. It will be seen that the tread member may be readily removed from the tire by unfastening the bolt and swinging the clamps outward. In placing the tread member it may be necessary to deflate the tire, but this is best as after the clamps are fastened in position, the inflation of the tire will seat the tread member 1 on the casing so that it will not creep or rock.

A plurality of these tire lugs may be used on a wheel and good results have been obtained from the use of four. The tread edges of the ears being curved inward with relation to the center of the wheel or upward with relation to the surface supporting the wheel, will not engage a paved street or road or the floor of a garage. The edges of the tread member may be rounded and this member may be made comparatively thin. It will be obvious that a wheel equipped with these lugs cannot become bogged or stuck in a soft road bed, such as sand or mud and traction will be had in snow and slush. The wedge-shape of the ears is important as it enables the ears to readily enter the road-bed and as easily withdraw with the least resistance. It is obvious that the elements 7 may slide upon the felly 10, thus allowing the device to move inwardly with the tire, when it is compressed.

What I claim is:

A tire traction device, comprising a longitudinally curved plate to be arranged transversely of a pneumatic tire, said plate tapering toward its ends, said plate being provided in its tread portion with serrations extending transversely of the plate and in the plane of rotation of the wheel, wedge-shaped ears arranged upon opposite sides of the tire and extending radially with relation to the wheel, said wedge-shaped ears increasing in width outwardly and rigidly secured to the curved plate to reinforce and stiffen the same, said ears being equidistantly spaced from the edges of the curved plate, said ears having their outer ends curved and forming in effect a continuation of the serrated portion of the plate, and means to hold the device upon the tire.

In testimony whereof I affix my signature.

GEORGE W. SMITH.